April 1, 1941.                J. MUROS ET AL                2,236,760
                              SHAVING IMPLEMENT
                             Filed July 19, 1937
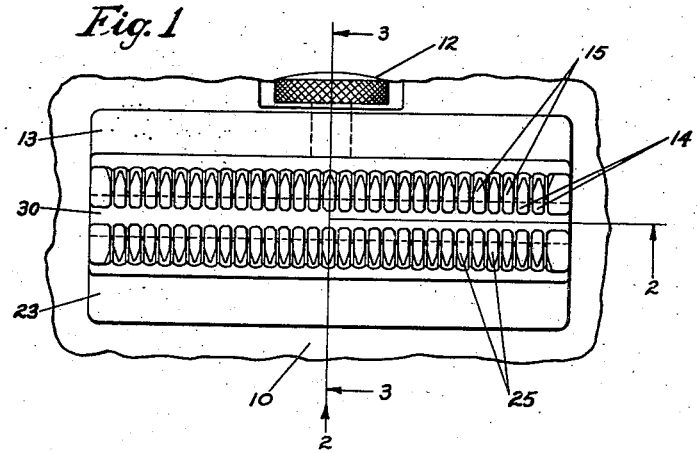
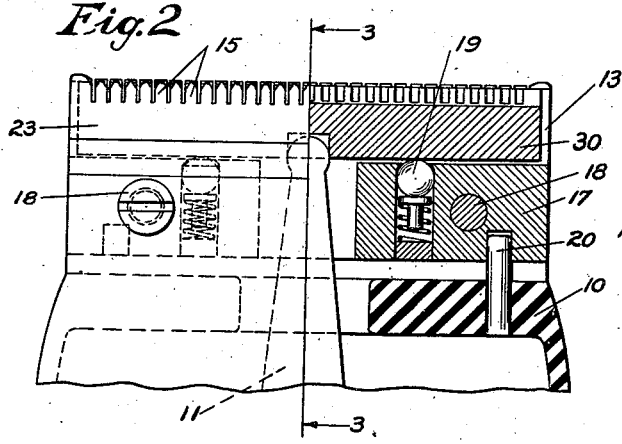
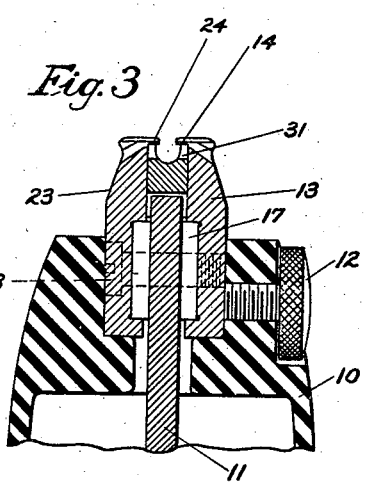
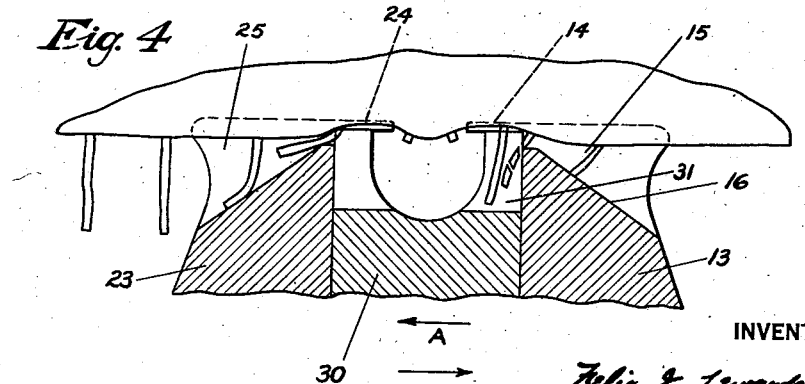
INVENTORS

UNITED STATES PATENT OFFICE 2,236,760

SHAVING IMPLEMENT

Joseph Muros, Cambridge, and Felix J. Lewando, South Boston, Mass., assignors to Gillette Safety Razor Company, Boston, Mass., a corporation of Delaware Application July 19, 1937, Serial No. 154,376

6 Claims. (Cl. 30—43)

This invention relates to dry-shaving implements of the type employing co-operating shearing members. The invention consists broadly in an implement having a stationary shearing member with surfaces disposed at an angle to each other, in co-operation with a cutter member having similar angularly disposed shearing faces arranged to co-operate with those of the stationary member. More specifically, the implement is provided with two converging series of shearing teeth operating respectively in angularly disposed planes and adapted to shave hairs presented thereto in either of said planes or zones. By this embodiment of our discovery we are able to provide a dry-shaving implement which is more comfortable for the user and more rapid and efficient in its shaving action than implements of this general type heretofore available.

In the prior Letters Patent No. 2,129,064, granted September 6, 1938 on an application of Lewando is disclosed a dry-shaving implement in which the shearing zone is disposed substantially normal to the surface to be shaved, that construction marking an important advance in the art at its time. In one aspect the present invention consists in an improvement upon the implement of said prior patent. By it is added to the normally disposed shearing zone a supplementary shearing zone disposed at an angle thereto and adapted to co-operate with the shearing teeth operated in the normal zone, or to act instead of them, with the result that one of these shearing zones is always more advantageously disposed than the others for a hair reaching the implement at a given angle.

The implement herein shown is organized with two oppositely arranged sets of shearing teeth, each set having a series of teeth with vertical and horizontal components and, while this is the best mechanical construction now known to us, the present invention is not limited to this nor to any other precise arrangement of the shearing zones.

These and other features of our invention will be best understood and appreciated from the following description of a preferred embodiment thereof, selected for purposes of illustration and shown in the accompanying drawing, in which—

Fig. 1 is an end or plan view of the implement on an enlarged scale;

Fig. 2 is a similar view of the implement in side elevation, partly in section;

Fig. 3 is a sectional view on the line 3—3 of Fig. 1; and

Fig. 4 is a diagrammatic sectional view on a still larger scale illustrating the behavior of hairs passing to the shearing zones of the implement.

The implement includes in its structure an elongated casing 10 of moulded material, such as "Bakelite," shaped to serve as a handle and also as a housing for a small electric motor and actuating mechanism including a lever 11 by which the movable shearing element of the implement is operated. The casing 10 is formed at its upper end with spaced flanges to receive the metallic head of the implement and one of these flanges is drilled and threaded to receive a clamping screw 12 for the head.

The implement is herein illustrated in an upright position and the terms, "vertical," "horizontal," "upward," "downward," etc., are used in describing the implement in such position.

The head of the implement includes a pair of stationary shearing members, which are herein utilized as guard members and which are substantially identical in shape. Both of these members are elongated and generally rectangular in contour. The member 13 has an inner vertical face and an overhanging flange 14 projecting inwardly from its upper edge. Both the body portion of the member 13 and its flange 14 are slotted to provide a series of transversely extending teeth 15. The slots forming the teeth 15 open through the inner vertical face of the guard member and through the lower horizontal face of the flange 14, thus providing a series of vertical or upright shearing edges and a series of horizontal or transverse shearing edges located in planes disposed substantially at right angles to each other so that the two series of teeth converge to a common vertex line. The bottom wall 16 of each slot is inwardly and upwardly inclined to a point near the inner vertical wall of the member 13 and at this point it is deflected horizontally forming a shoulder and defining a short horizontal passage opening through the inner vertical wall of the member 13.

A similar but oppositely arranged stationary member 23 constitutes the other side of the implement, this member having an inwardly extending overhanging flange 24 and being slotted to provide a series of transverse teeth 25. The slots of the member 23 have the same inclined bottom surface and in both members the slots extend out through the leading edge of the implement and flare outwardly, as shown in Fig. 1, to facilitate entrance of hairs between the teeth in the use of the implement. Both the flanges 14 and 24 are thickened at the extreme ends of the implement to provide stout guard lugs or fenders.

The intermediate slotted portions of the flanges form in effect a flat shear plate having a central longitudinal slot provided with a series of shearing teeth on both sides thereof.

The two stationary shearing members 13 and 23 are bolted rigidly together in spaced relation through the medium of a pair of rectangular spacing blocks 17 and transverse bolts 18. The heads of the bolts 18 are countersunk into the member 23 and the bolts are threaded into the member 13. Each of the blocks 17 is provided with a hole in its bottom surface to receive a dowel pin 20 which projects upwardly between the flanges of the casing 10 for the purpose of positively locating the head of the implement with respect to the operating lever 11 which is oscillated by the motor, not shown.

The reciprocatory cutter member 30 comprises a solid elongated bar having spaced upstanding ribs 31 at each longitudinal edge of its upper face. These ribs are transversely slotted to form two oppositely arranged series of shearing teeth having vertical shearing edges co-operating with the vertical shearing edges of the stationary members 13 and 23 and horizontal shearing edges underlying and co-operating with the horizontal shearing edges of the teeth 15 and 25. It will be noted from Figs. 3 and 4 of the drawing that the flanges 14 and 24 overhang the ribs 31 of the cutter member. For example, it is good practice to design the flanges 14 and 24 with an overhang of approximately .034" and the ribs 31 with a width of approximately .015", thereby providing an overhang of about .019" in the stationary teeth 15 and 25 with respect to the movable teeth in the ribs 31 of the reciprocatory cutter. It should be noted at this point that by this feature of construction the face of the user is effectively guarded from contact with the movable parts of the cutter and particularly from the ends of the teeth of the reciprocatory member 30. In use, therefore, the implement gives a particularly smooth and pleasant sensation on the face. The cutter member 30 is of such width as to slide freely between the vertical faces of the stationary side members 13 and 23, maintaining shearing relation on both sides between the vertical series of shearing teeth in the members 13 and 23 and the vertical shearing edges presented by the sides of the teeth in the ribs 31. It is pressed upwardly at all times against the overhanging flanges 14 and 24 by a pair of spring-pressed balls 19, one of these being received in an upwardly opening socket provided for the purpose in each of the spacer blocks 17. The space between the blocks 17 affords clearance for the oscillatory operating lever 11 which is rounded at its upper end and received in a socket provided in the lower face of the cutter 30.

It will be seen that the head of the implement comprises two oppositely arranged sets of shearing teeth, both having vertical and horizontal edges, or edges that converge to a common vertex. The arrangement of the shearing teeth is symmetrical and the implement may be moved in either direction on the face with the same results. The action of the implement is suggested in Fig. 4 where it is shown on approximately a 10 to 1 scale with the skin-engaging face of the teeth 15 and 25 pressed against the face of the user. It will be noted that the skin bulges slightly into the space between adjacent teeth and also into the space between the ends of the slotted flanges 14 and 24 and that the vertical shearing plane is located intermediate the ends of the slots that form the horizontal shearing teeth.

As the implement is moved over the face of the user in either direction hairs are encountered and travel inwardly into the slots defining the teeth 15 and 25. If the hair is shorter than the height of the shoulder in the bottom of the slot it may pass directly to the horizontal shearing zone beneath the flange 14 or 24. If, on the other hand, the hair is long enough to contact with the bottom 16 of the slot, as suggested at the left-hand side of Fig. 4 the hair is gradually deflected as the implement moves to the left until it is bent across the vertical shearing zone at the inner vertical wall of the member 23 where it is immediately severed. In the movement of the implement back and forth upon the face hairs may enter from either side of the implement to be sheared in any one of the four shearing zones or they may be sheared in different places in two different shearing zones. Or in placing the implement upon the face the hair may be trapped between the teeth of the flanges 14 and 24 and reach one or other of the shearing zones by passing from the inside of the implement instead of from the outside of the implement. As suggested at the right hand side of Fig. 4, the implement being moved in the direction of the arrow B, hairs may enter the implement in an inclined position and be deflected upwardly by the bottom surface 16 so that they are sheared several times at the vertical shearing zone and progressively shortened and then finally sheared again in the horizontal shearing zone beneath the flange 14.

The slots between the teeth 15 and 25 flare outwardly and transversely, as best shown in Fig. 1 with the result that the skin of the user bulges further down between the teeth in the outer portion of the skin-engaging area of the implement than it does as the planes of the inner vertical faces are approached. The skin is, therefore, deflected upwardly to some extent when it reaches the vertical shearing zone and hairs at this point are bent sharply across the shearing plane and sheared off with very short remaining stubble. This condition is suggested with the implement moving in the direction of the arrow A, at the left side of Fig. 4. Whatever may be the exact process of shearing the result is that the user derives a close, comfortable and rapid shave.

It will be noted that the endmost teeth in both horizontal series are wider and thicker than the intermediate teeth and, therefore, act as rugged corner guards for the more fragile parts of the implement.

Having thus disclosed our invention and described a preferred embodiment thereof for purposes of illustration, but not by way of limitation, we claim as new and desire to secure by Letters Patent:

1. A dry shaving implement including in its structure a head having a body with intersecting surfaces forming reentrant angles therein opposed to each other at opposite sides of the implement and separated by an open space, said body being slotted to provide converging shearing teeth in each pair of intersecting surfaces, and a cutter member having slotted surfaces presenting co-operating shearing teeth acting progressively with the intersecting teeth of the body to reduce the length of hairs passing through the implement.

2. A dry shaving implement including in its structure a head having side members with inner vertical surfaces and inwardly extending portions spaced from each other and presenting horizontal surfaces, said members being slotted to provide a series of shearing teeth in each of all four surfaces, and a reciprocatory cutter having an upstanding rib at each longitudinal edge, said ribs being slotted to provide series of shearing teeth in the outer surfaces of each rib and also in the upper surface of each rib for shearing respectively in two planes at right angles to each other.

3. A dry shaving implement comprising a stationary member having inner parallel side walls and inturned flanges spaced from each other, said member being slotted in both sides to present upright shearing edges and transverse shearing edges in its overhanging flanges, a slotted cutter having also upright shearing edges and transverse shearing edges which are shorter than the transverse shearing edges of the stationary shearing member and are thus guarded thereby at their inner ends, the bottoms of the slots in the side walls presenting inwardly and upwardly inclined surfaces between the teeth.

4. A dry shaving implement including a stationary member having a vertical wall and an overhanging flange, both slotted to provide teeth with shearing edges lying in the angularly disposed planes of said wall and flange, the vertical wall being of substantial thickness and the bottom of each of its slots presenting an inwardly inclined hair-deflecting surface, and a reciprocatory cutter having teeth with shearing edges disposed similarly to those of the stationary shear member and the stationary teeth overlying the outer corners of the cutter teeth.

5. A dry shaving implement including a pair of side members having inwardly directed flanges spaced from each other at their inner edges and parallel side walls and being slotted to provide distinct series of top and side shearing teeth in the flanges and in the side walls respectively, the side walls being of substantial thickness and the bottom of each of its slots presenting an inwardly inclined hair-deflecting surface between the teeth, and an elongated cutter arranged to reciprocate in the space between the side members and having side shearing and top shearing teeth therein.

6. A dry shaving implement having shearing members with open-ended slots providing cooperating shearing edges arranged substantially parallel to the skin-engaging face of the implement and with further cooperating shearing edges lying substantially at right angles to the skin-engaging face of the implement and located intermediate the ends of the slots forming the shearing edges which are parallel to skin-engaging face of the implement, said slots having inclined bottom surfaces and being of such length as to form teeth for holding down the skin on both sides of the shearing edges which are at right angles to the skin-engaging face of the implement.

FELIX J. LEWANDO.
JOSEPH MUROS.